(12) United States Patent
Quazi

(10) Patent No.: US 10,004,179 B2
(45) Date of Patent: Jun. 26, 2018

(54) VERTICAL GROW LIGHTS WITH FRAME MOUNTS

(71) Applicant: Boulder Lamp, Inc., Lafayette, CO (US)

(72) Inventor: Fazle Quazi, Boulder, CO (US)

(*) Notice: Subject to any disclaimer, the term of this patent is extended or adjusted under 35 U.S.C. 154(b) by 28 days.

(21) Appl. No.: 15/268,098

(22) Filed: Sep. 16, 2016

(65) Prior Publication Data
US 2017/0079216 A1  Mar. 23, 2017

Related U.S. Application Data

(60) Provisional application No. 62/219,811, filed on Sep. 17, 2015.

(51) Int. Cl.
| | | |
|---|---|---|
| *A01G 7/04* | (2006.01) | |
| *F21V 21/116* | (2006.01) | |
| *H01J 61/82* | (2006.01) | |
| *F21S 8/08* | (2006.01) | |
| *F21V 29/503* | (2015.01) | |
| *F21V 29/58* | (2015.01) | |
| *F21V 29/76* | (2015.01) | |
| *F21V 23/02* | (2006.01) | |
| *F21Y 105/16* | (2016.01) | |
| *F21Y 115/10* | (2016.01) | |
| *F21Y 113/20* | (2016.01) | |

(52) U.S. Cl.
CPC ............... *A01G 7/045* (2013.01); *F21S 8/08* (2013.01); *H01J 61/827* (2013.01); *F21V 23/023* (2013.01); *F21V 29/503* (2015.01); *F21V 29/59* (2015.01); *F21V 29/763* (2015.01); *F21Y 2105/16* (2016.08); *F21Y 2113/20* (2016.08); *F21Y 2115/10* (2016.08); *Y02P 60/149* (2015.11)

(58) Field of Classification Search
CPC ............................... Y02P 60/149; F21V 29/59
See application file for complete search history.

(56) References Cited

U.S. PATENT DOCUMENTS

| | | | | |
|---|---|---|---|---|
| 4,045,911 A | * | 9/1977 | Ware ...................... | A01G 7/045 108/23 |
| 7,049,743 B2 | * | 5/2006 | Uchiyama ............... | A01G 7/045 257/E33.059 |
| 7,812,543 B2 | * | 10/2010 | Budike, Jr. ........ | H05B 37/0272 315/157 |
| 8,338,801 B2 | * | 12/2012 | Ishiwata ................ | A01G 7/045 250/492.1 |

(Continued)

OTHER PUBLICATIONS

Buddha Box vertical grow light system advertisement and product description from Amazon.

*Primary Examiner* — Alan Cariaso
(74) *Attorney, Agent, or Firm* — Patent Law Offices of Rick Martin, P.C.

(57) ABSTRACT

An improved ceramic discharge vertical lamp tower is designed for growing plants. A plurality of daisy chained ballast boxes are mounted between a pair of vertical frame members. Each ballast box powers a ceramic discharge lamp or any chosen alternative. Each ballast box may also power auxiliary LED lights. A controller can vary the cycle times of each augmented LED light panel and/or the ceramic discharge lamp. Various cooling heatsink designs include air and water.

17 Claims, 19 Drawing Sheets

(56) References Cited

U.S. PATENT DOCUMENTS

2009/0058192 A1* 3/2009 Wilhelm ............ H05B 37/0227
                                                    307/112
2016/0165809 A1* 6/2016 Mason ................... A01G 7/045
                                                    29/428
2016/0356465 A1* 12/2016 Polete .................. H05B 37/029

* cited by examiner

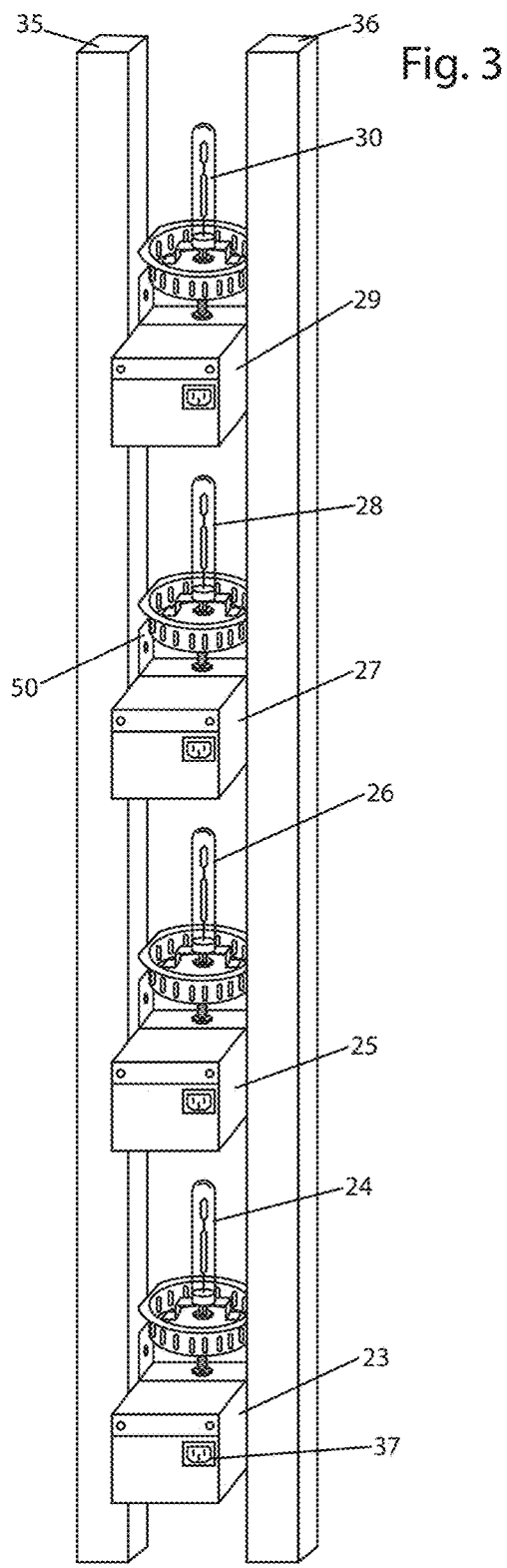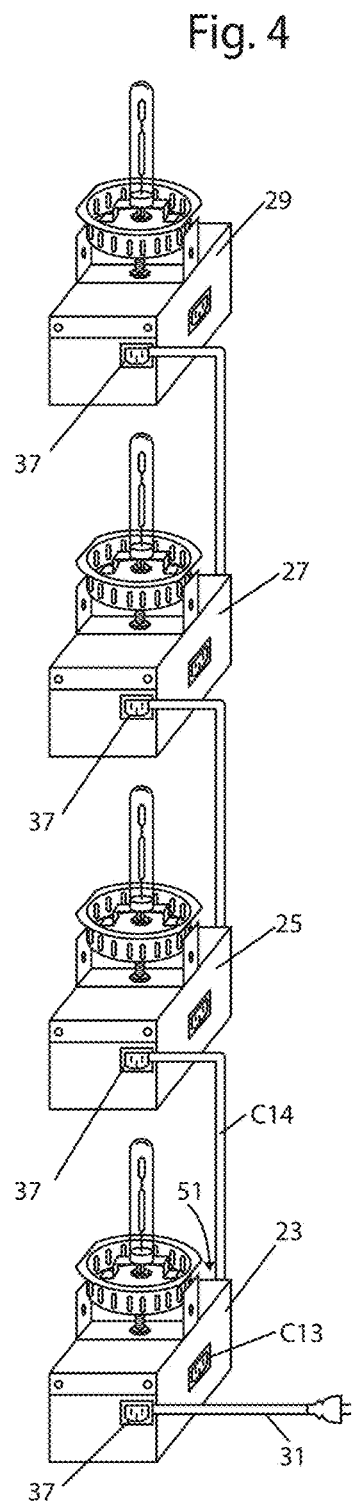

(PRIOR
ART)

800

(PRIOR
ART)

(PRIOR
ART)

35

(PRIOR
ART)

150

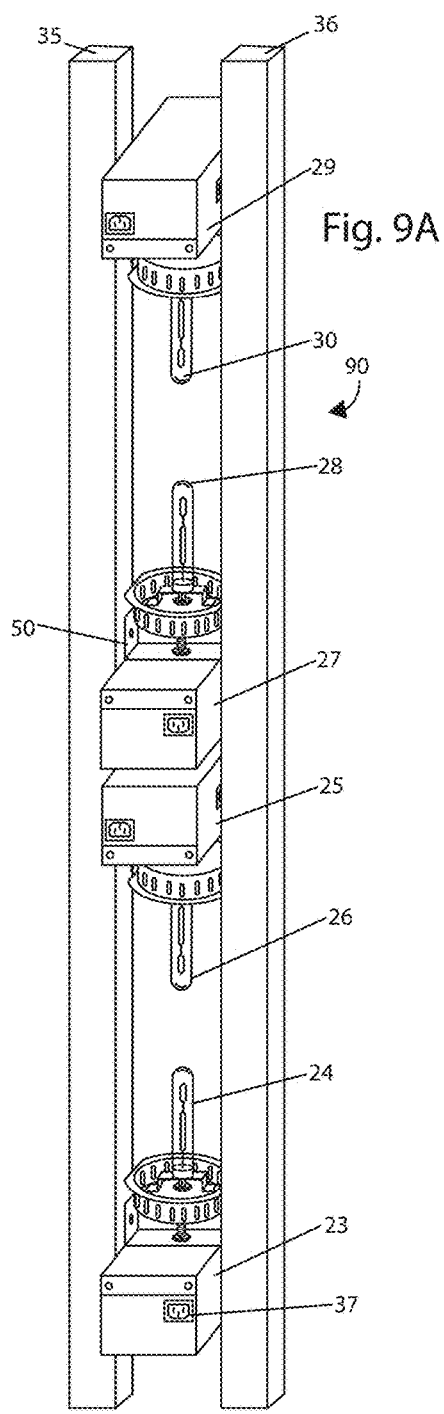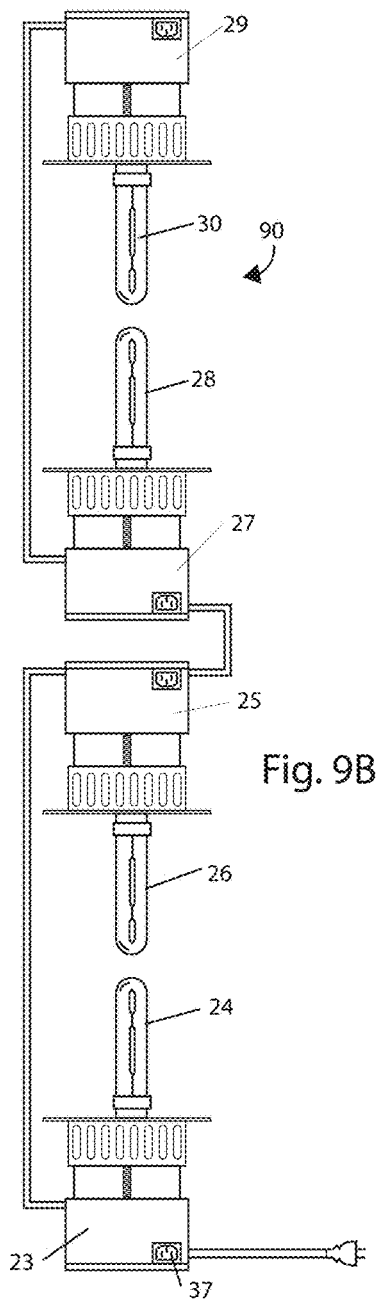

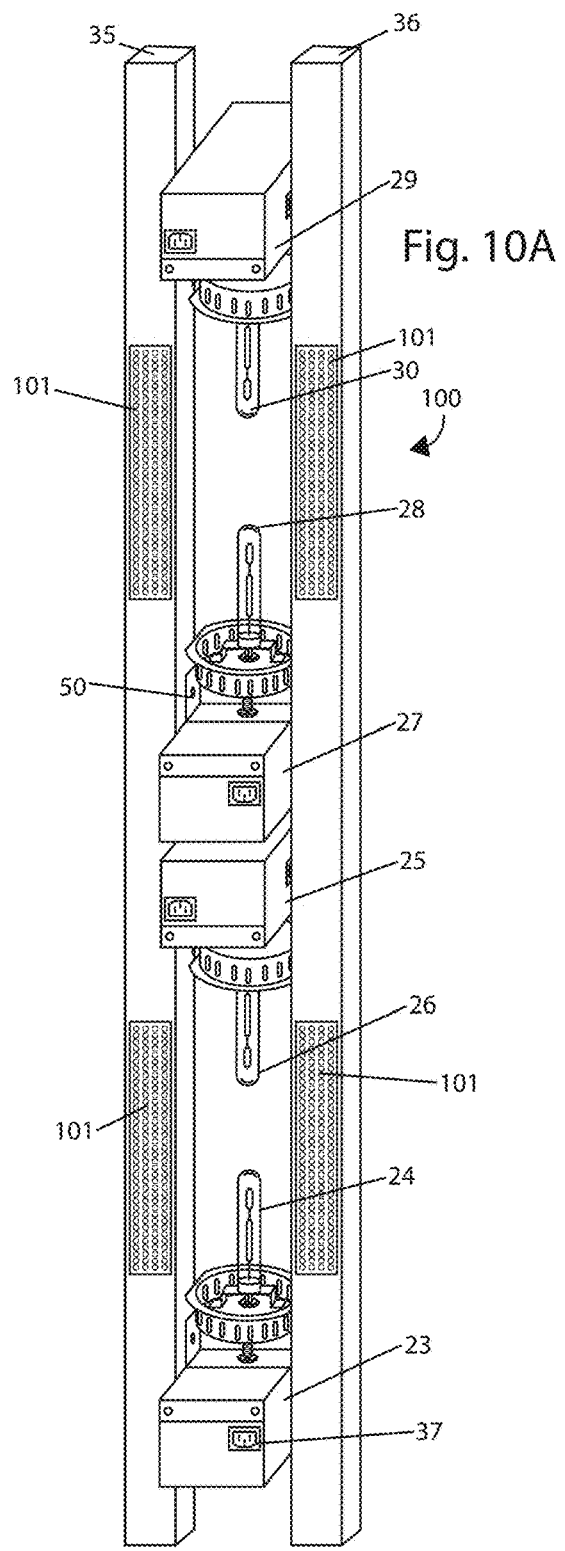

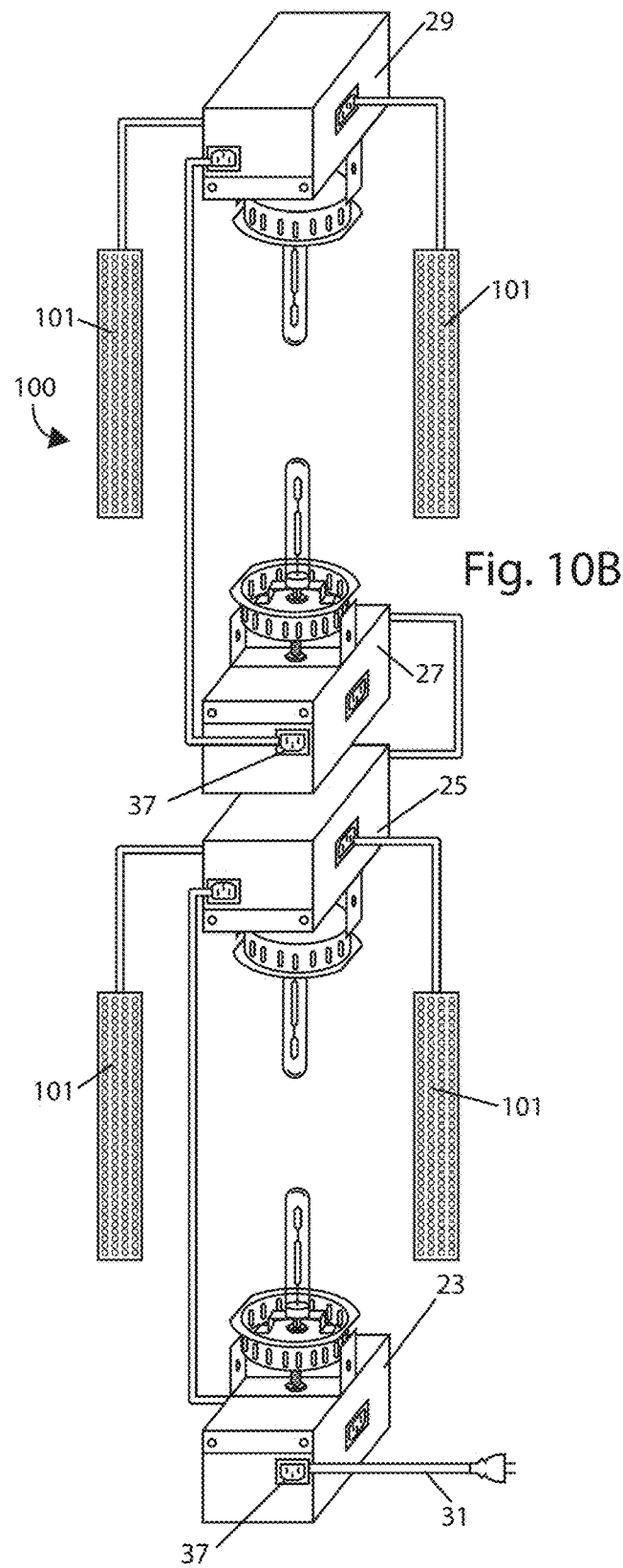

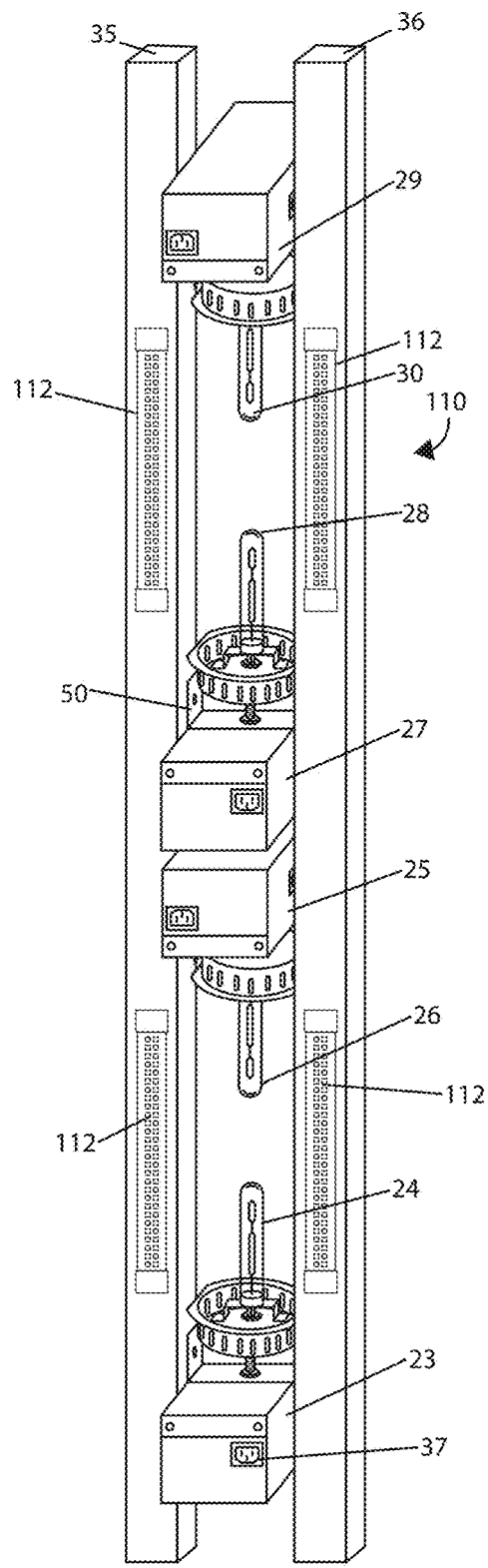

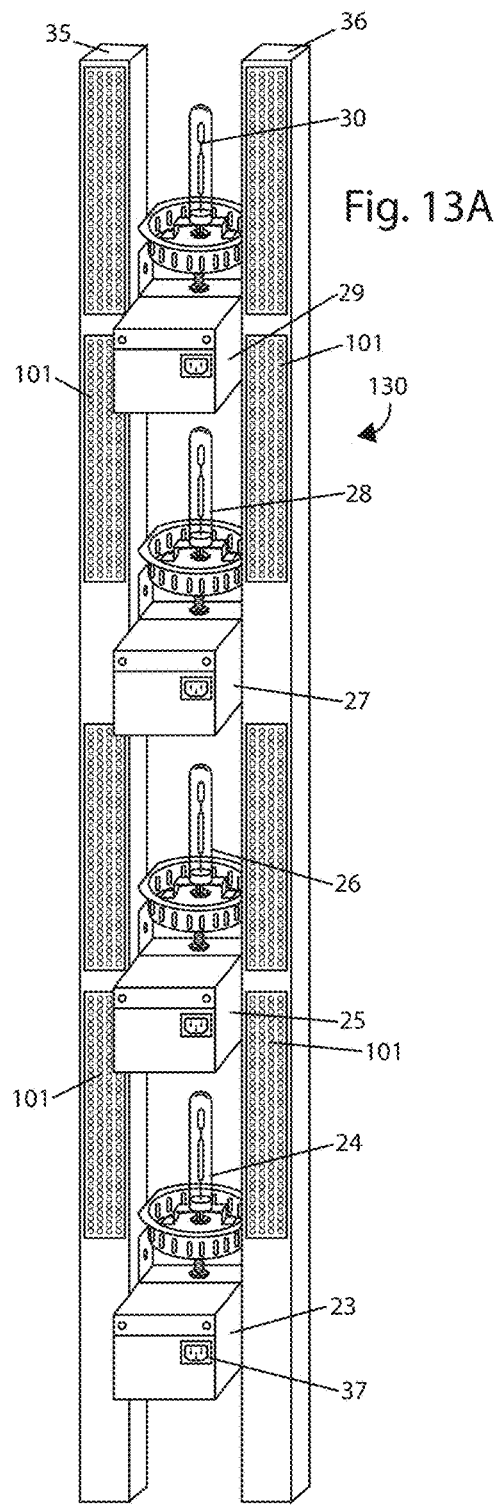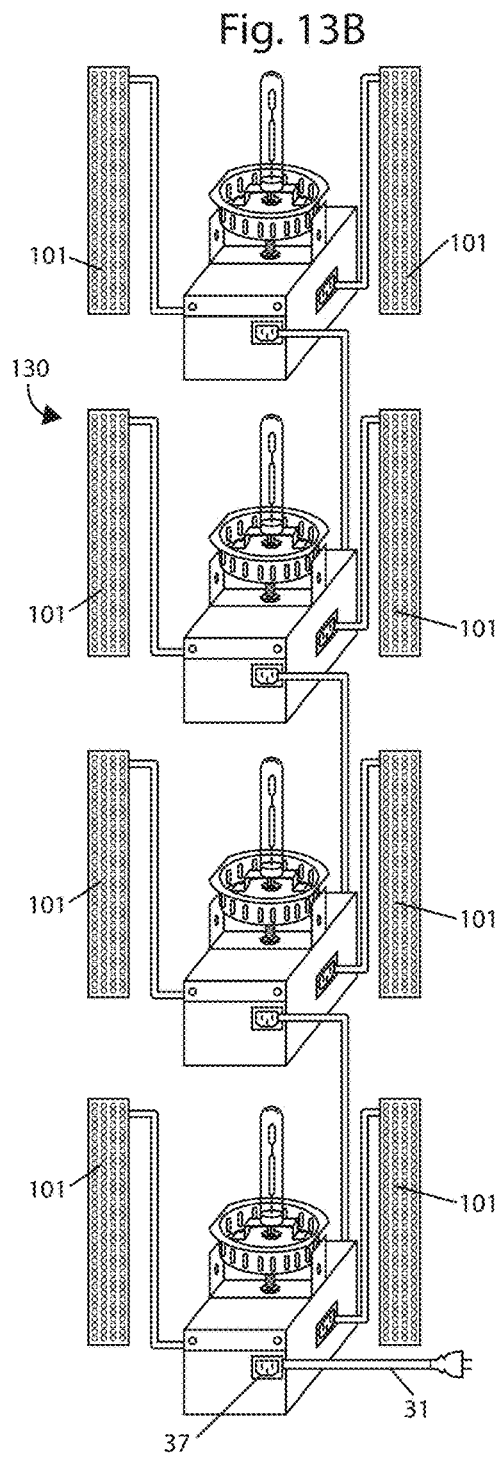

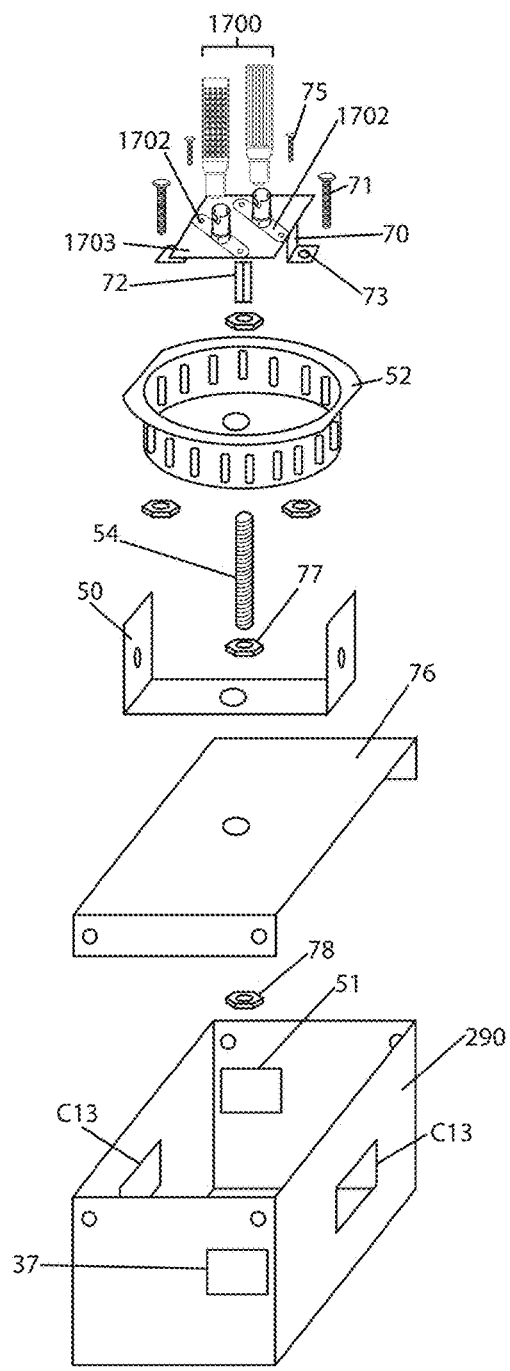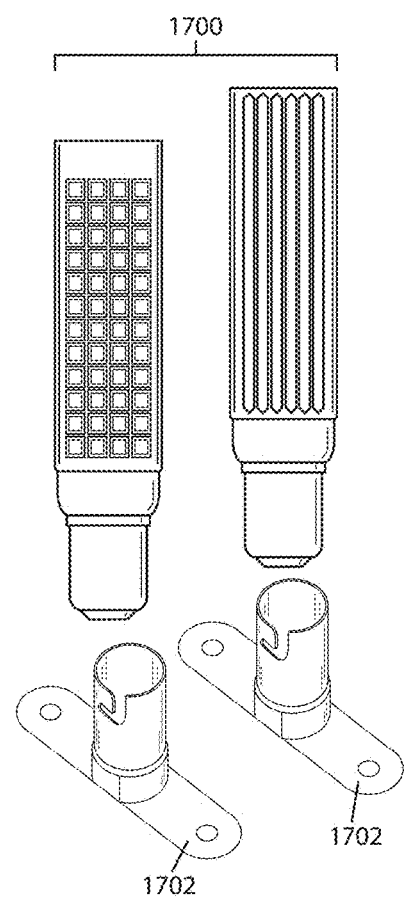
Fig. 17A
Fig. 17B

Fig. 19A
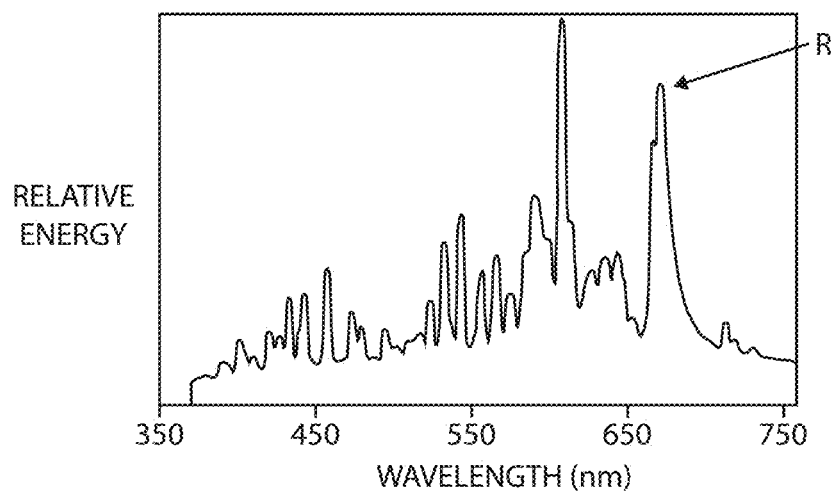
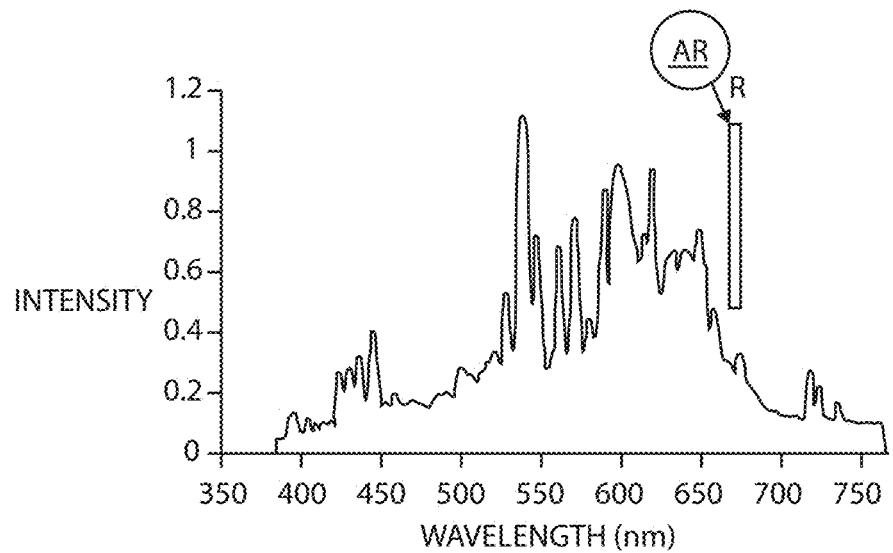
Fig. 19B

VERTICAL GROW LIGHTS WITH FRAME MOUNTS

CROSS REFERENCE PATENTS

This is a non-provisional application claiming property to provisional application Ser. No. 62/219,811 filed Sep. 17, 2015.

FIELD OF INVENTION

The present invention relates to providing a vertical grow tower with integrated selections of high intensity discharge lamps and optional LED enhancement lights.

BACKGROUND OF THE INVENTION

It is known in the art that ceramic discharge lamps (CDL) deliver more useful grow light and produce less heat than LED's. It is know that CDL lamps' spectrum closely match sunlight. A popular greenhouse grow light is the 315 w Philips Agro lamp, the CDM-T Elite™.

Vertical grow rooms are popular to maximize the plant production in a small footprint of floor space. One such system is the Big Buddha Box shown in FIG. 1. Vertical panels 1, 2, 3, 4 each have shelves 11 for plants 10 shown. A water reservoir 9 is located under each shelf to irrigate the roots. The panels 1, 2, 3, 4 are connected at corners to form a grow room cabinet 5.

Prior art lighting consists of a ceiling suspended lamp housing 12 having an upper lamp 7 hanging downward and facing a lower lamp 8 facing upward. The lamp housing 12 is air cooled.

What is needed in the art is a system that can provide vertical cabinet frame members which can be assembled into vertical grow room cabinets, wherein the vertical cabinet frame members (also called legs or rods or vertical brackets) can accommodate a plurality of new and non-obvious grow lamps attached thereto.

The present invention provides (preferably) a 315 w Phillips Agro Lamp with a custom ballast that has mounting brackets for vertical cabinet frame members. One powered receptacle can power a stack of these ballast/lamp via a daisy chain hookup. Auxiliary LED lighting can be mounted vertically to the vertical frame member. The same ballast box powers the LED lights. Cooling may be accomplished with water pumped through the vertical frame member.

SUMMARY OF THE INVENTION

An aspect of the present invention is to provide a ballast box suitable to mount in a vertical frame member.

Another aspect of the present invention is to provide a daisy chain connectivity to multiple ballast housings, powered by a single receptacle.

Another aspect of the present invention is to provide a vertical LED frame mounted strip light to interchangeably augment certain colors during the various growth phases. These colors could include UV, blue, red, far red, and infrared.

Another aspect of the present invention is to provide, for a solar panel inlet power source.

Another aspect of the present invention is to power the vertical LED frame mounted strip with the ballast box.

Another aspect of the present invention is to provide receptacles and ballasts for other main grow lights.

Another aspect of the present invention is to provide auxiliary LED or equivalent lights to modify the wavelength spectrum of a non-agro bulb to match the spectrum of an agro bulb. See FIGS. 19a, 19b.

Other aspects of this invention will appear from the following description and appended claims, reference being made to the accompanying drawings forming a part of this specification wherein like reference characters designate corresponding parts in the several views.

Color augmenting benefits using and LED or equivalent light to a main grow light.

Color augmentation will be used in 2 broad areas, namely, 1) converting a non-agro (commercial) lamp into an agro lamp and 2) indoor plant grow enhancement.

1. Converting a Non-Agro (Commercial) Lamp into Agro Lamp:

The primary differences between agro and non-agro lamps are as follows:
   a) UV part of light spectrum in commercial lamps are eliminated or minimized
   b) Red and blue parts of light spectrum in agro lamps are tailored.

Therefore, non-agro lamps can be made to provide agro lamp characteristics by desired color augmentation that generates an agro like spectrum, in particular, blue and red parts of the agro spectrum can be added.

2. Indoor Plant Grow Enhancement:

The agro lamp spectrum is augmented by color-specific LEDs for increasing rate of photosynthesis (Emerson effect), taste or potency of crops. Tailor-made augmenting LEDs may even fertilize plants, control pests and mold, and boost shelf life of fruits and vegetables.

BRIEF DESCRIPTION OF THE DRAWINGS

FIG. 3 is a front perspective view of an all lights facing upward four lamp vertical stack.

FIG. 4 is a schematic view of the wiring for FIG. 3.

FIG. 9a is a front perspective view of a vertical grow light tower with opposed pairs of lamps.

FIG. 9b is a wiring schematic of the FIG. 9a embodiment.

FIG. 10a is a front perspective view of a vertical grow light tower with color augmenting LED's.

FIG. 10b is a wiring schematic of the FIG. 10a embodiment.

FIG. 11 is a front perspective view of a vertical grow light tower with LED tube light augmentation.

FIG. 13a is front perspective view of a vertical grow light tower with upright lamps augmented with LED panels.

FIG. 13b is a wiring schematic of the embodiment shown in FIG. 13a.

FIG. 17a is an exploded views of a bayonet type lamp and ballast box.

FIG. 17b (prior art) is an exploded view of the lamp and socket shown in FIG. 17a.

FIG. 19a (prior art) is a graph of the spectrum of the Philips 315 w Agro grow light.

FIG. 19b is a graph showing how an LED augmentation (red) light can tune a Philips 315 w Elite MW3100 k lamp into the same spectrum of the Agro grow light shown in FIG. 19a.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Figure 1:
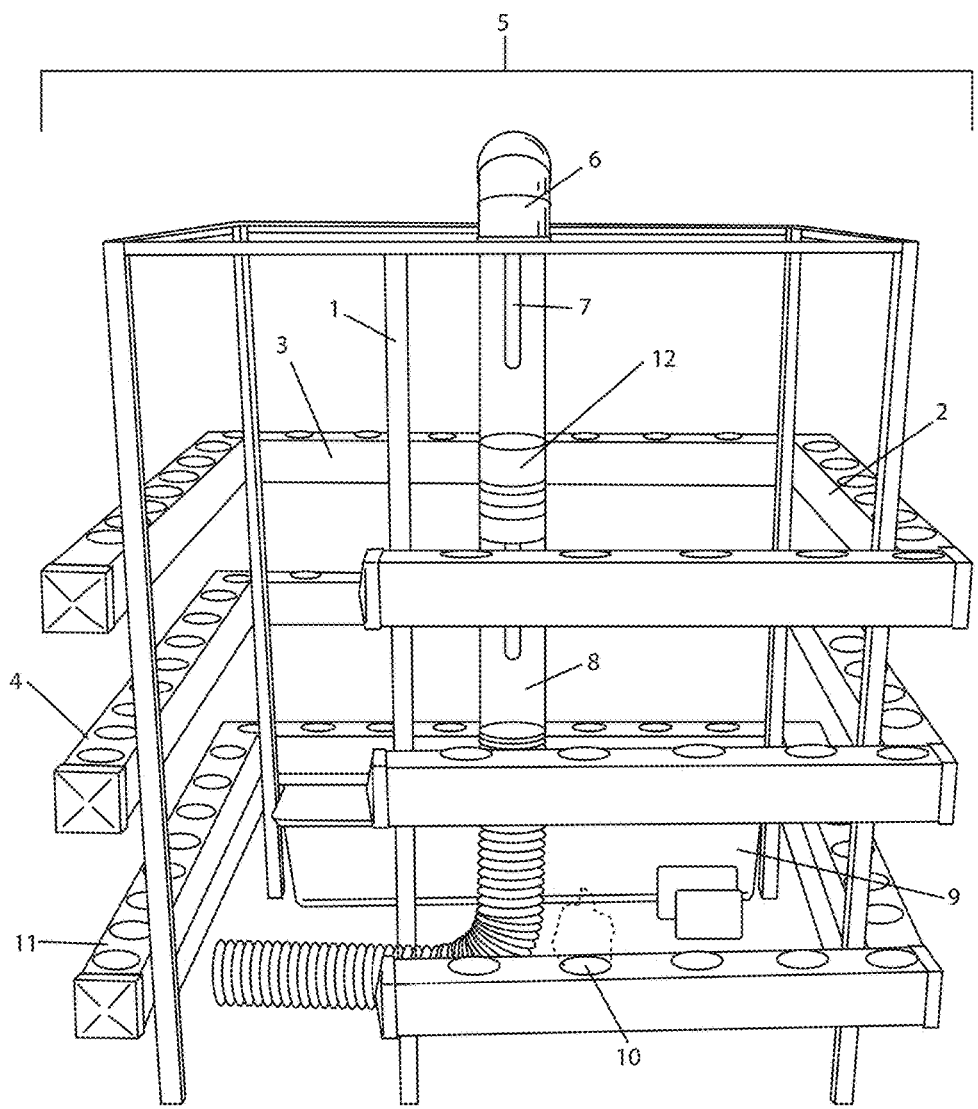
FIG. 1 (prior art) is a front elevation view of a vertical grow room, the Big Buddha Box.
Figure 2:
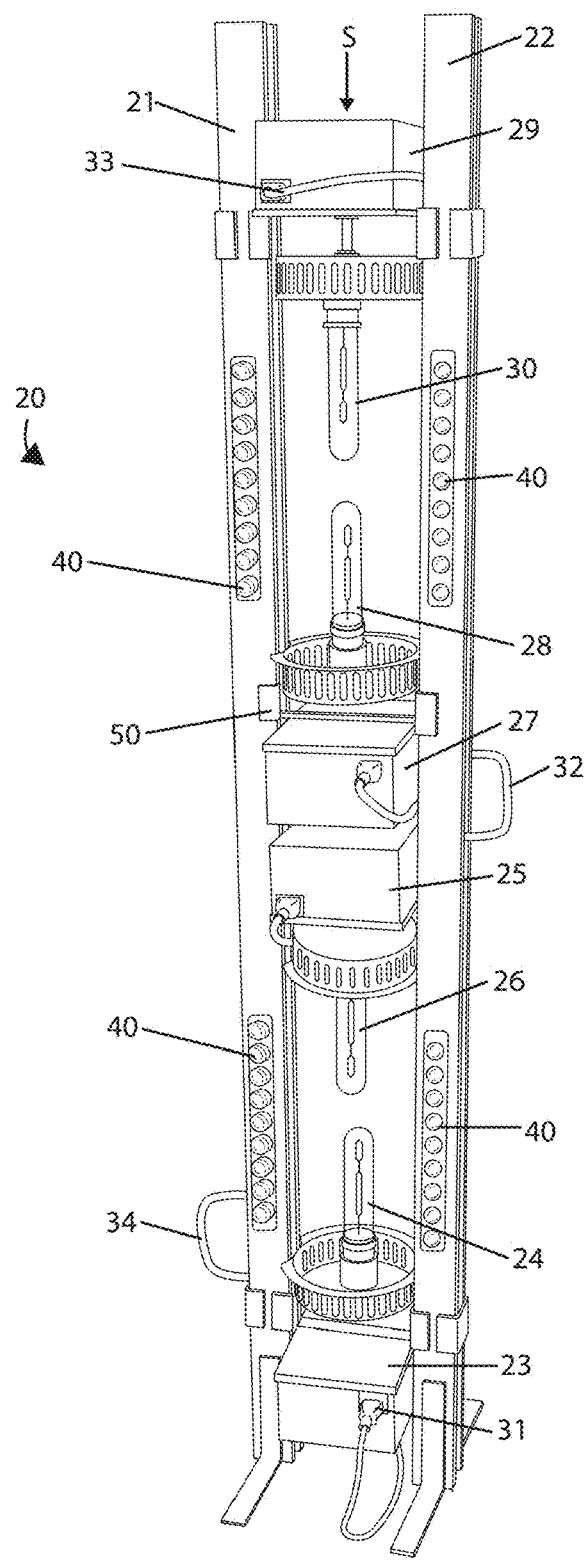
FIG. 2 is a front perspective view of a four lamp vertical stack of the present invention.

Referring first to FIG. 2 a vertical grow light tower 20 has a pair of parallel vertical frame members 21, 22. A space S is formed between frame members 21, 22. Ballast boxes 23, 25, 27, 29 are identical, as are ceramic bulbs 24, 26, 28, and 30 (preferably Philips 315 w ceramic metal halide Agro™). The ballast boxes have a single power cord 31 and daisy chain power cords 32, 33, 34. The frame members support any number of different LED augmentation lamps, shown are metal clad printed circuit board LEDs 40. They are cooled by back to back extruded aluminum frame members 21, 22. They are powered by their respective ballast box. Each ballast box has a pair of mounting brackets 50 with a bolt of screw connector to the frame members 21, 22.

Referring next to FIG. 3 a vertical grow light tower 300 has a pair of vertical frame members 35, 36 which are hollow square tubes. This embodiment mounts all ceramic bulbs (or any other chosen type bulb) facing upwards.

Referring next to FIG. 4 power inlet socket 37 can receive the power cord 31 or a daisy chain power cord C14. Female power socket C13 can power augmentation LED lights (see FIG. 2, LEDs 40). Output power receptacle (female) is labeled 51.

Figure 5:
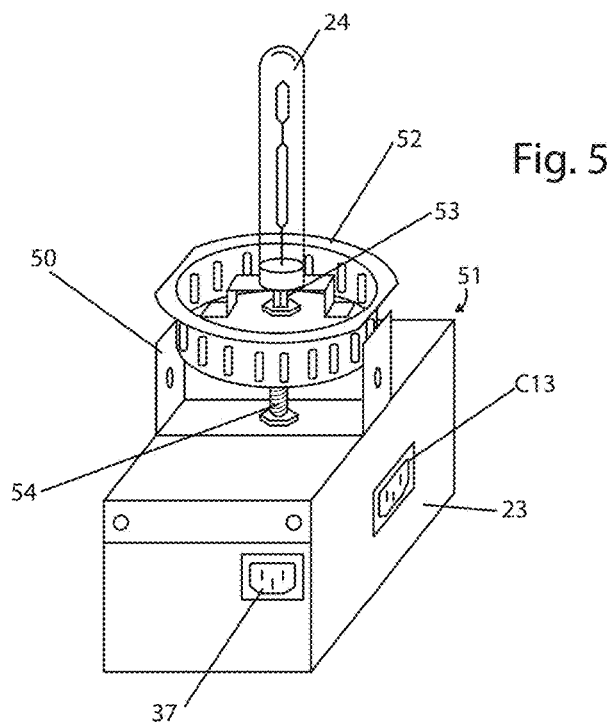
FIG. 5 is a front perspective view of one ballast and LED driver housing.

Referring next to FIG. 5 the lamp 24 is supported by a lamp socket holder canopy 52 that supports socket 53. A support rod 54 supports members 52, 53, 24.

Figure 6:
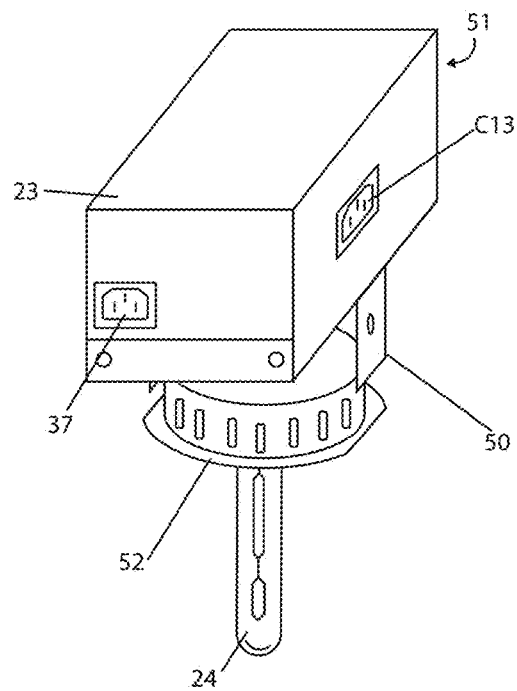
FIG. 6 is a front perspective view of one upside down ballast and LED driver housing.

Referring next to FIG. 6 the ballast box 23 is shown mounted upside down.

Figure 7:
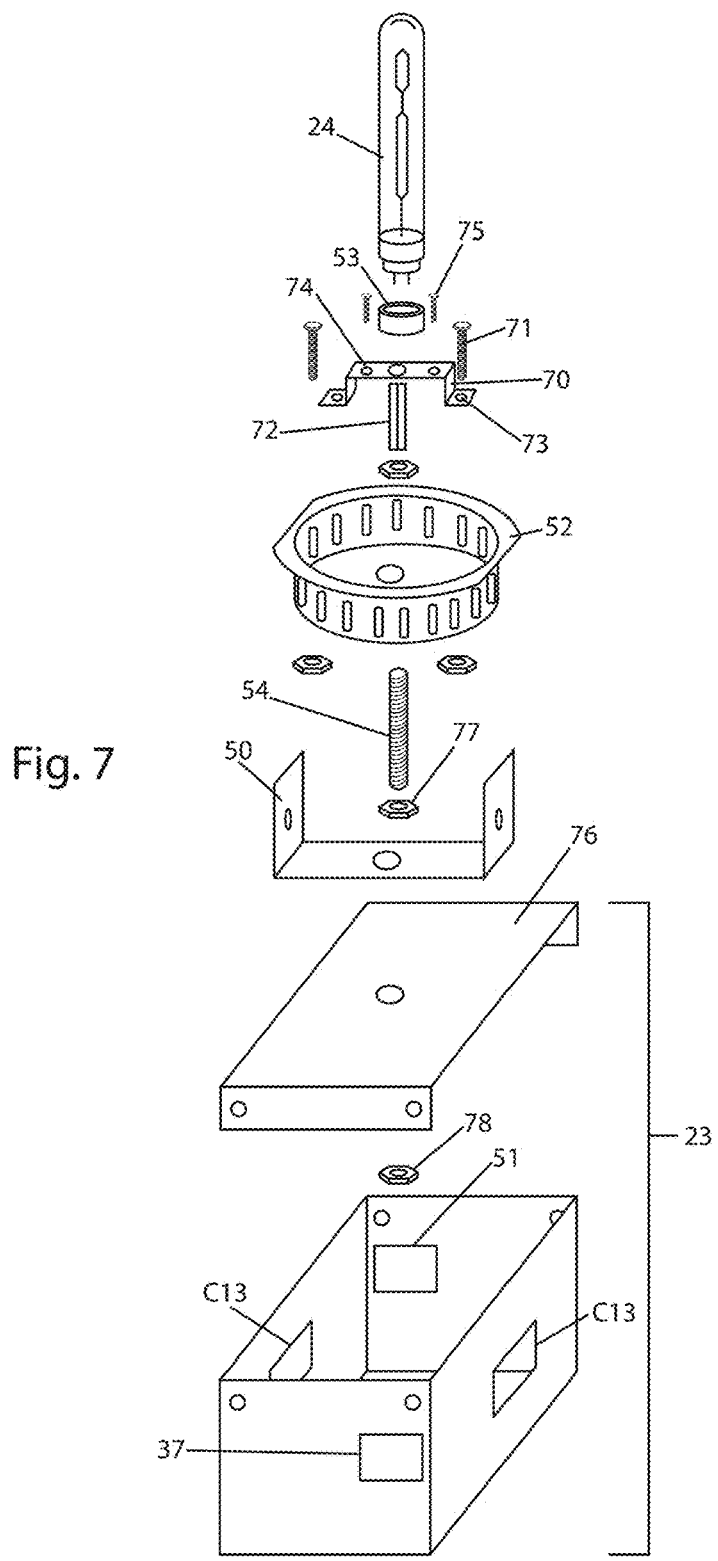
FIG. 7 is an exploded view of the FIG. 5 ballast and LED driver housing.

Referring next to FIG. 7 bolts 75 secure the socket 53 via holes 74 in socket mount bracket 70. Bolts 71 secure the socket mount bracket 70 via holes 73 to the lamp socket holder canopy 52. Support rod 54 is a threaded nipple conduit with nuts 77, 78 securing it to the tip 76 of ballast box 23. Lamp wire 72 travels through support rod 54 into the ballast box 23.

Figure 8A:
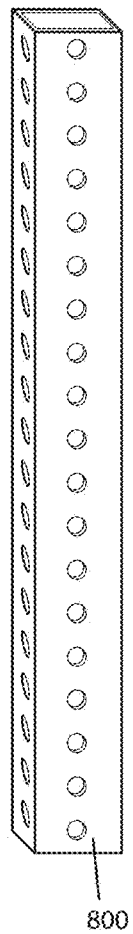
FIG. 8a (prior art) is a front perspective view of an aluminum/steel hollow square tube vertical frame member.
Figure 8B:
FIG. 8b (prior art) is a front perspective view of an aluminum/steel "L" angle vertical frame member.
Figure 8C:
FIG. 8c (prior art) is a front perspective view of an aluminum/steel hollow square tube vertical frame member.
Figure 8D:
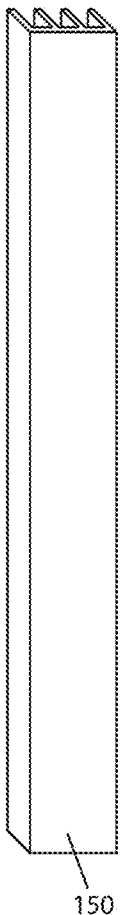
FIG. 8d (prior art) is a front perspective view of an aluminum extruded heatsink vertical frame member.

Referring next to FIGS. 8a-8d (all prior art), FIG. 8a is a vertical frame member made of aluminum or steel. It is a hollow square tube with pre-drilled holes. FIG. 8b is aluminum/steel "L" angle with pre-drilled holes. FIG. 8c is aluminum/steel hollow square tube. This vertical frame member could also serve as a water cooling circulation device (a heatsink) for LEDs mounted thereto. FIG. 8d is an aluminum extruded heatsink which can be assembled into a back to back vertical frame member.

Referring next to FIGS. 9a, 9b a vertical tower 90 has the ceramic lamps 24/26, 28/30 facing each other as a design choice.

Referring next to FIGS. 10a, 10b a vertical tower 100 has metal clad printed circuit board color augmenting LED panels 101. Panels could be mounted on the back of vertical frame members 35, 36 as well. All LED panels 101 are powered by the ballast boxes as shown in FIG. 10b.

Referring next to FIG. 11 a vertical tower 110 has multiple LED tube lights 112 fastened to vertical frame members 35, 36 which can be water fed heatsinks.

Figure 12:
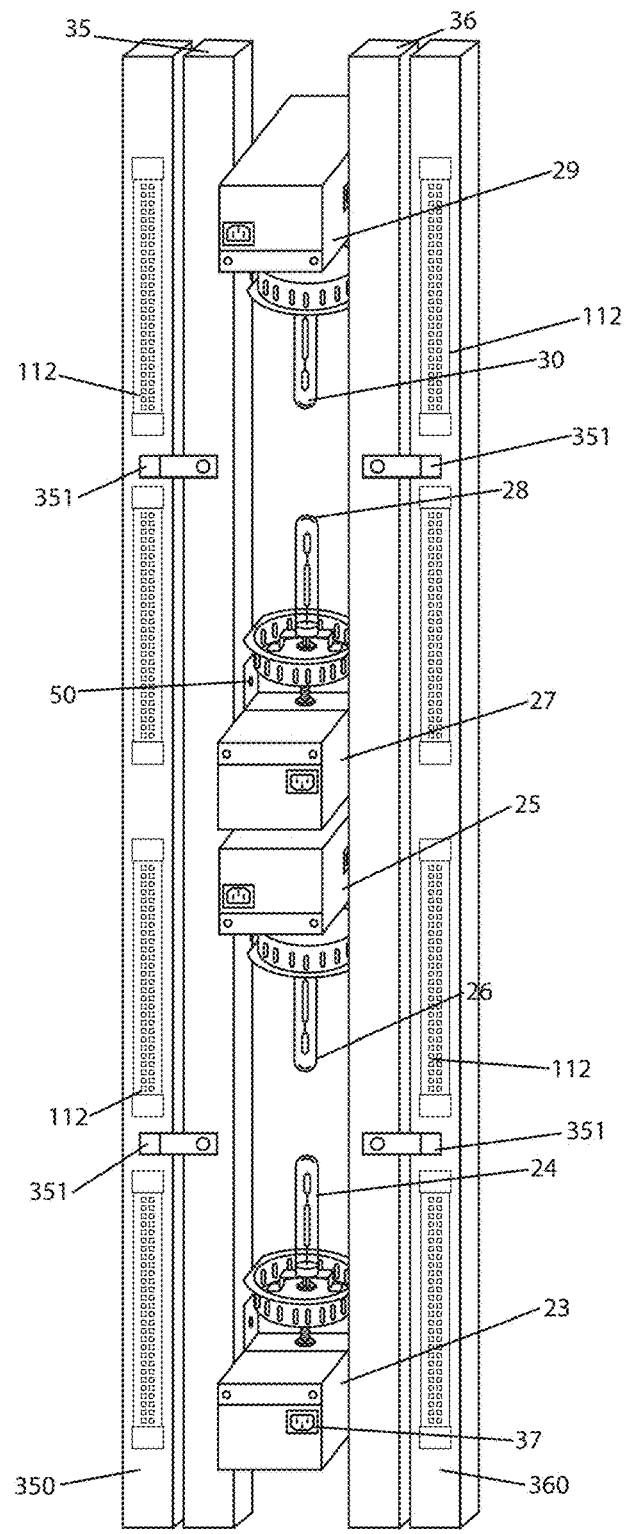
FIG. 12 is a front perspective view of a vertical grow light tower with a parallel frame LED arrangement.

Referring next to FIG. 12 a vertical tower 120 has a parallel frame arrangement. Auxiliary vertical frame members 350, 360 have a mounting bracket 351 connection to vertical frame members 35, 36.

Referring next to FIGS. 13a, 13b, the vertical tower 130 has vertical frame members 35, 36 can be water heatsinks with circulating water inside members 35, 36.

Figure 14:
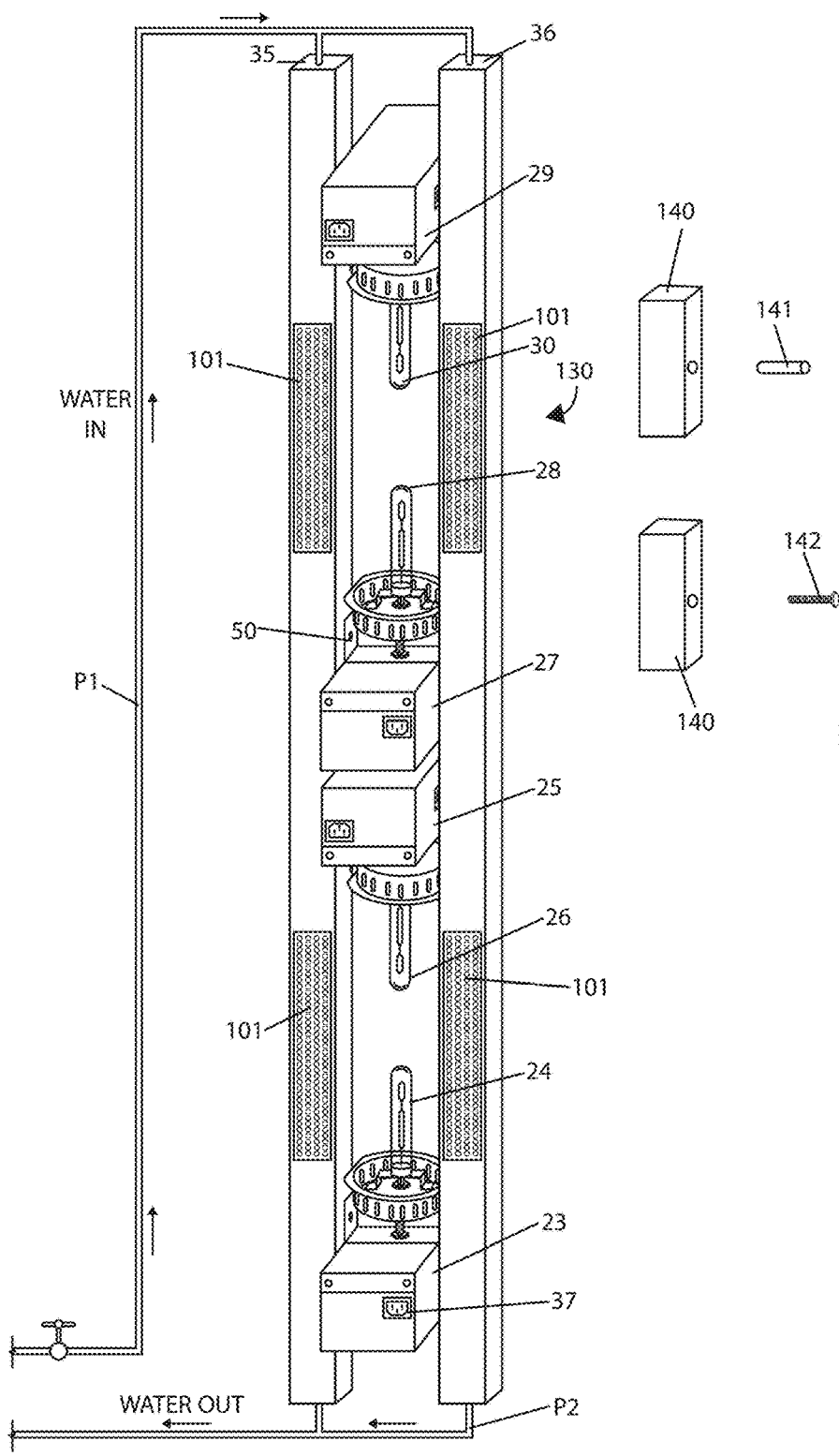
FIG. 14 is a partially exploded view of a water cooled tower.

Referring next to FIG. 14 the vertical tower 130 is shown with a circulating water system. Pipe P1 carries water in direction water in. Pipe P2 returns the cooling water in direction water out. Vertical frame member segment 140 shows a hollow metal tube insert 141 welded on both ends to the tube segment 140. This allows the bolt 142 to secure the ballast box 29 in a waterproof structure.

Figure 15:
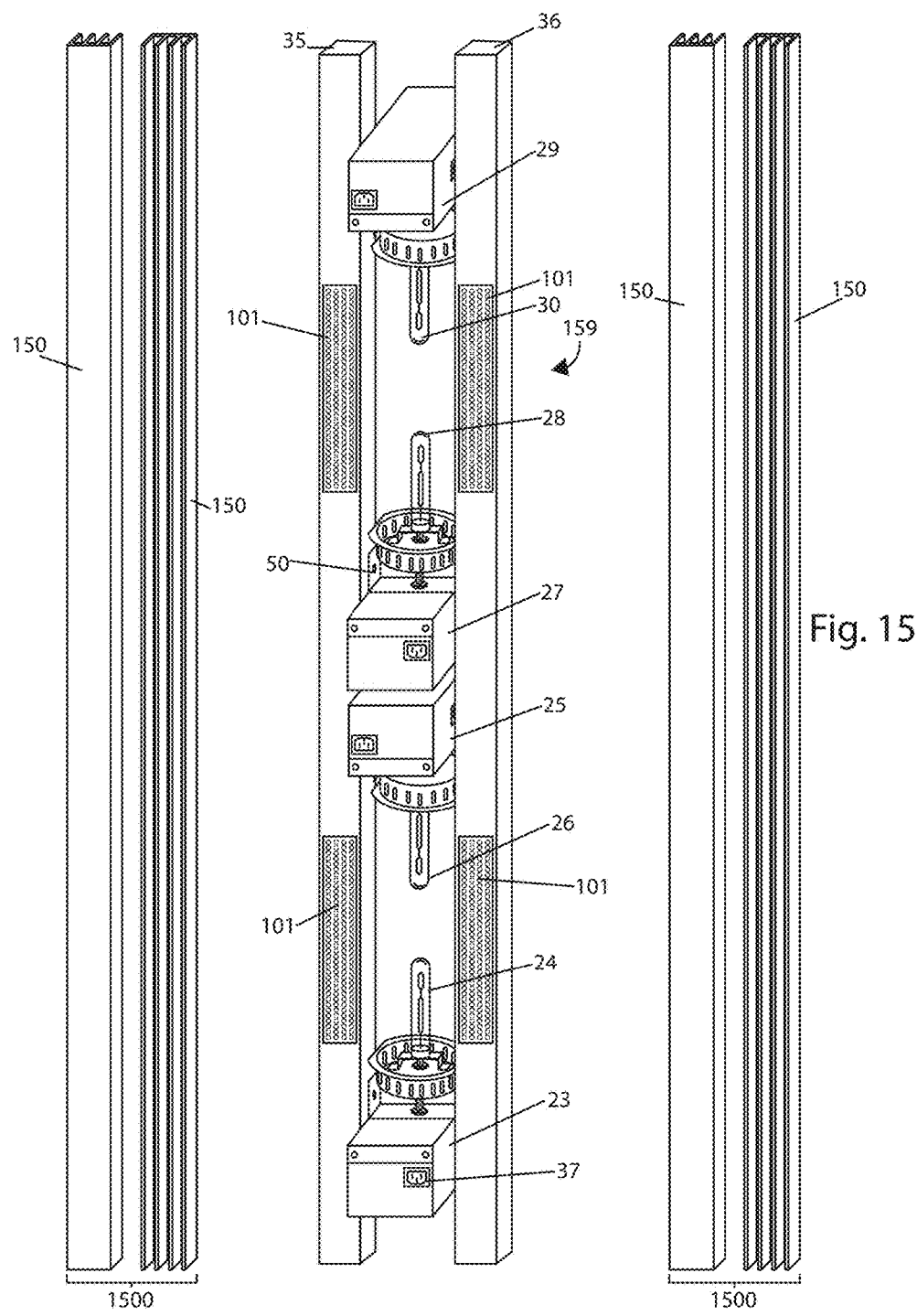
FIG. 15 is a partially exploded view of an air cooled tower.

Referring next to FIG. 15 the vertical tower 159 replaces vertical members 35, 36 with back to back aluminum extruded heatsinks 150 which form vertical members 1500.

Figure 16:
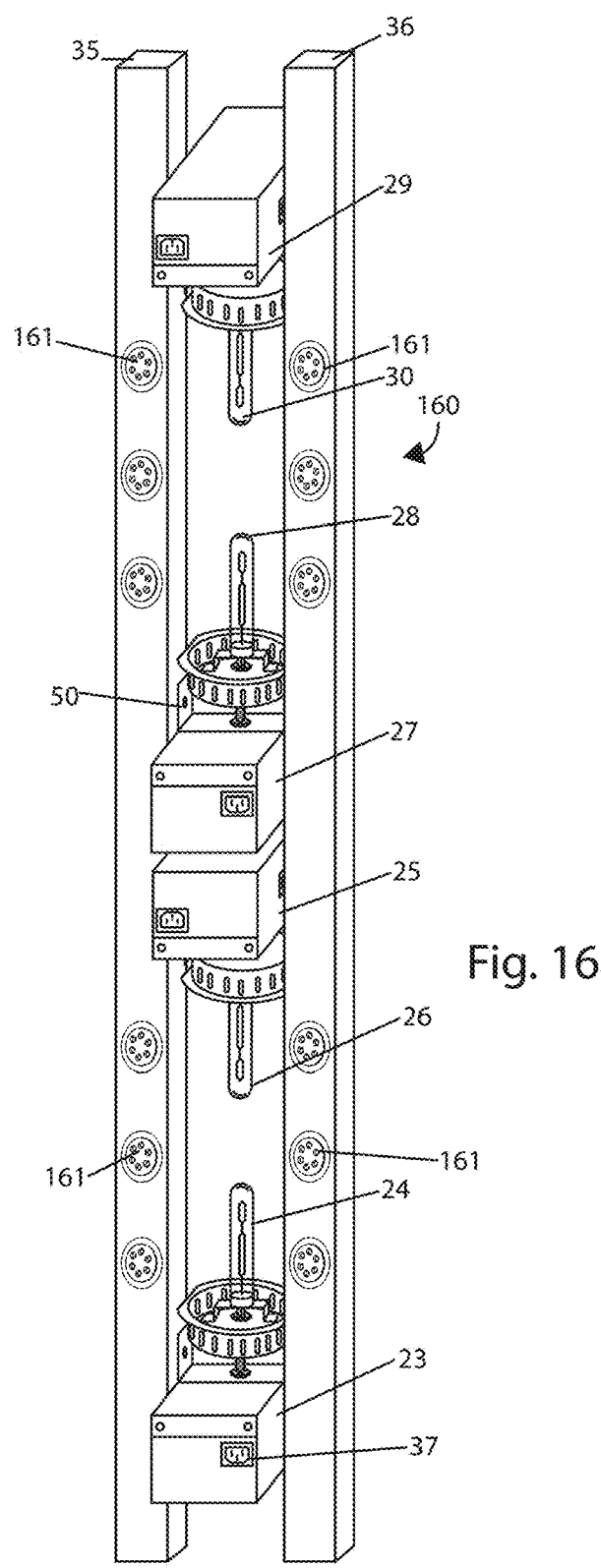
FIG. 16 is a front perspective view of an LED augmented tower using recessed type LEDs.

Referring next to FIG. 16 vertical tower 160 uses recessed type LEDs 161. Vertical frame members 35, 36 can be water cooled as shown in FIG. 14.

Referring next to FIGS. 17a, 17b the driver box 290 powers an alternate lamp 1700 which consist of dual LED bayonet lamps 1701. Sockets 1702 mount via bolts 75 to the socket mount plate 1703. See FIG. 17 for like parts.

Figure 18:
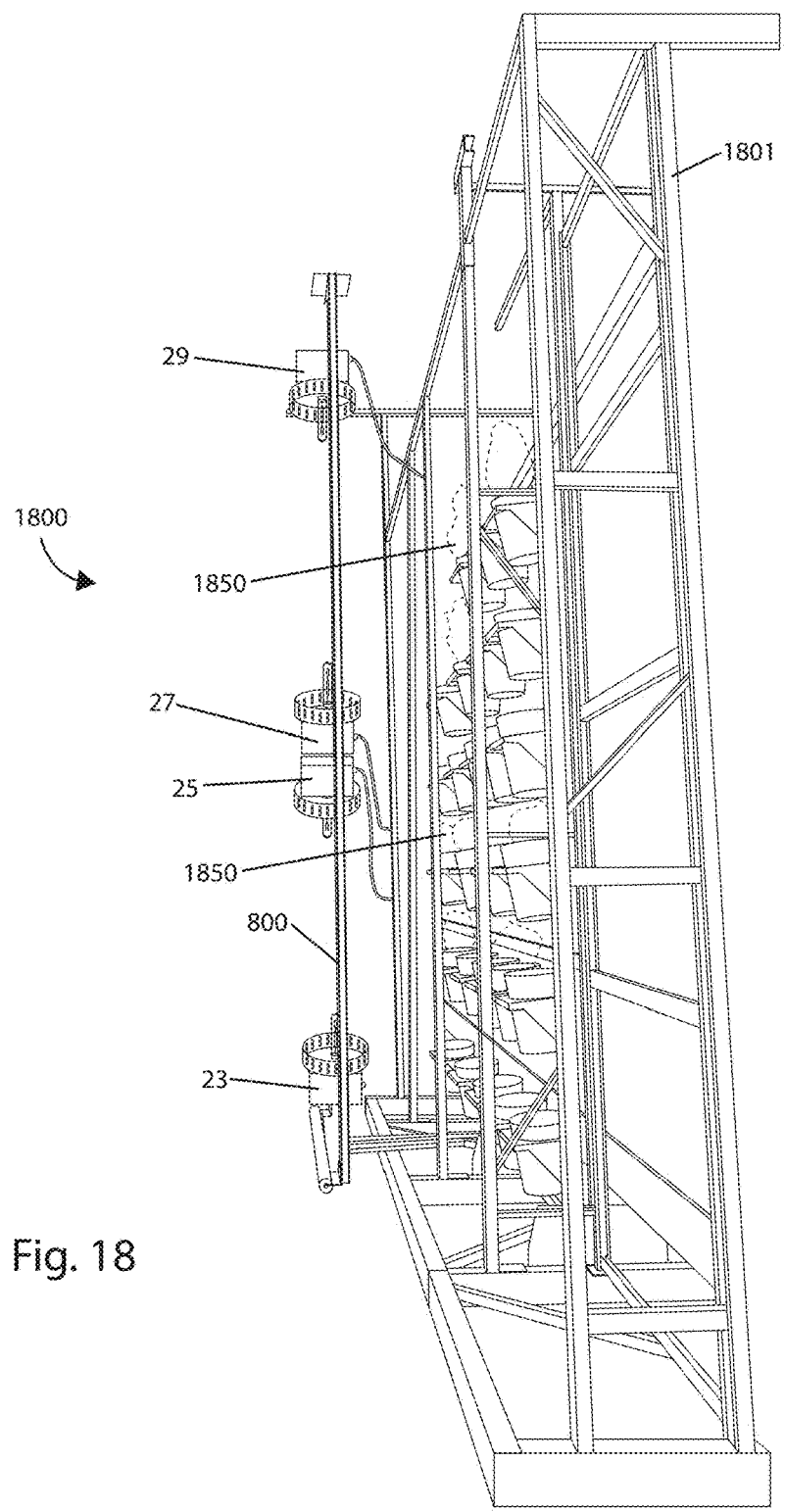
FIG. 18 is a front perspective view of a grow room using a plurality of vertical towers.

Referring next to FIG. 18 a prototype grow room 1800 uses three vertical towers 1801 which use vertical frame members 800. See FIG. 8a. The plants are labeled 1850.

Several ballast boxes can be daisy chained using standard power cables. This feature saves money at the greenhouse by reducing the number (by up to ten per 20 A circuit breaker) of high voltage receptacles.

The CDL lamp 107 is preferably the prior art Phillips Mastercolor CDM-T Elite Med Wattage Agro. The product data follows below.

| Product Data General Characteristics | |
| --- | --- |
| Base | PGZX18 |
| Bulb | T12 [38 mm] |
| Bulb Finish | Clear |
| Operating Position | Universal [Any or Universal (U)] |
| Main Application | Agro |
| Life to 10% failures EL | 12000 hr |
| Avg. Hrs. Life | 30000 hr |
| Light Technical Characteristics | |
| Color Code | — |
| Color Rendering Index | 92 Ra8 |
| Color Designation | — |
| Color Temperature | 3100K |
| Color Temperature technical | 3100K |
| Initial Lumens | 33000 Lm |
| Luminous Efficacy Lamp EL | 105 Lm/W |
| Lumen Maintenance 8000 h | 90% |
| Photosynthetic Photon Flux PPF | 1.9 umol/s |
| Chromaticity Coordinate X | 0.41- |
| Chromaticity Coordinate Y | 0.365- |
| Electrical Characteristics | |
| Watts | 315 W |
| Lamp Wattage EL 25° C., Rated | 315.0 W |
| Lamp Wattage EL 25° C., Nominal | 315.0 W |
| Lamp Voltage | 98 V |
| Lamp Current EL | 3.15 A |
| Lamp Current Run-up | 4.7 A |
| Ignition Time | 3 (max) s |
| Run-up time 90% | 3 (max) min |
| Re-ignition Time [min] | 10 (max) min |
| Environmental Characteristics | |
| Energy Efficiency Label (EEL) | A+ |
| Mercury (Hg) Content | 28 (max) mg |
| Picogram per Lumen Hour | 44.4 p/LuHr |
| Energy consumption kWh/1000 h | 346 kWh |
| UV-related Characteristics | |
| Damage Factor D/fc | 0.17- |
| PET (NIOSH) | 241 h5001x |
| UV A | 4.65 mW/cm2 |
| UV B | 0.02 mW/cm2 |
| UV C | 0.02 mW/cm2 |
| Luminaire Design Requirements | |
| Cap-Base Temperature | 250 C. |
| Pinch Temperature | 350 (max) C. |
| Bulb Temperature | 350 (max) C. |

An optional controller C can control periodic pre-programmed ON/OFF cycles for each peripheral light panel. Dangerous UV-C light panels may have time delay safety circuits or equivalent systems to prevent humans from exposure.

All control and memory functions may also be executed wirelessly utilizing an off-the-shelf wireless transmitter and receiver and, as well as by downloading a custom app into a smartphone and optional Bluetooth communication.

The power line Pow connects the ballast 27 to the controller C. Controller relays send the power, as programmed, to the LEDs 161. See FIG. 16.

Figure 19C:
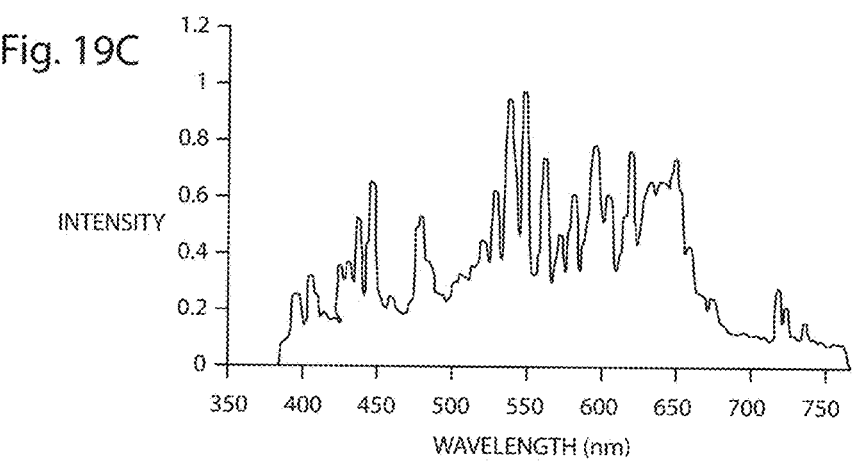
FIG. 19c (prior art) is a graph of the spectrum of the Philips 315 w CDM Elite 4200 k lamp which could also be augmented like FIG. 19b illustrates.
Figure 19D:
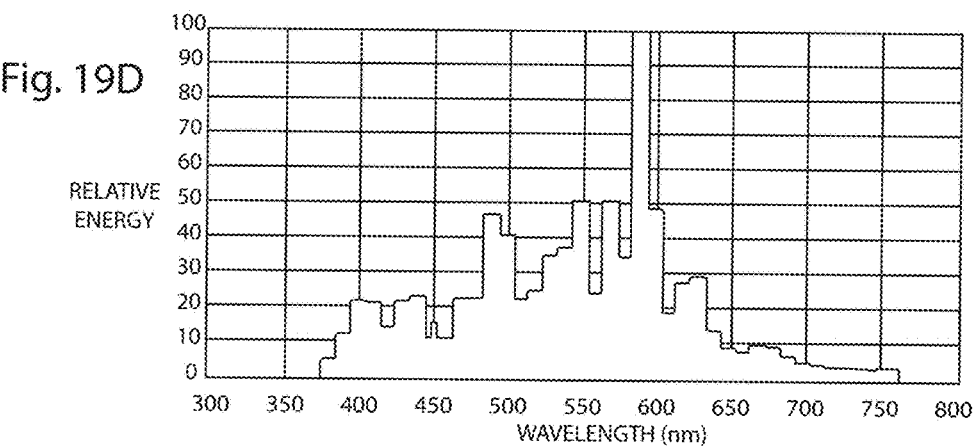
FIG. 19d (prior art) is a graph of the spectrum of the Venture 315 w CMH lamp which could also be augmented like FIG. 19b illustrates.
Figure 19E:
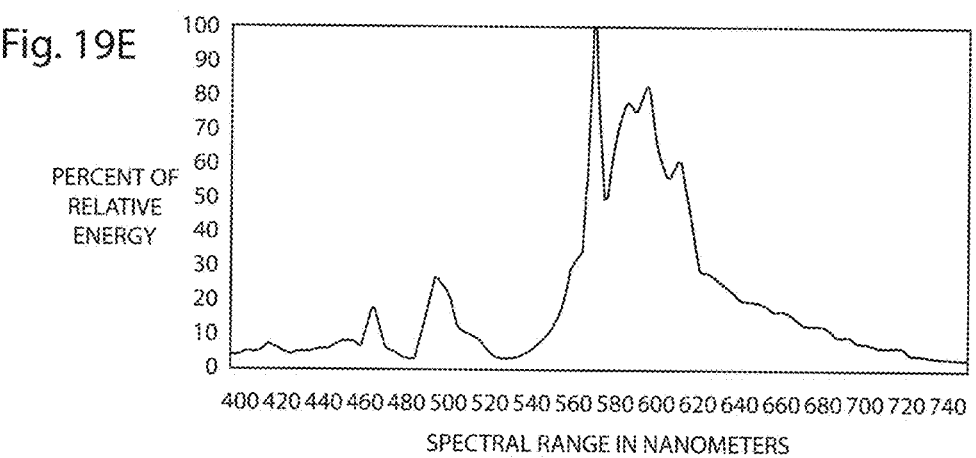
FIG. 19e (prior art) is a graph of the spectrum of the Hortilux 600 w HPS lamp which could also be augmented like FIG. 19b illustrates.

Here is how growers can select their peripheral light panels:

Referring next to FIGS. 19*a*-19*e*, FIG. 19*a* shows the popular Agro lamp spectrum with a prominent red wavelength noted at R. FIG. 19*b* shows how the Elite MW3100 k lamp lacks the prominent red wavelength. The augmentation (LED) strip 1950 provides the red wavelength RA. Other augmenting (LED) strips could provide UV shown as 1951, Emerson effect shown as 1952 and special effects 1953 such as eliminate fertilizer requirements.

Grow Hack: How to Use a UV Lamp to Increase THC

High Times—by Sirius J Mon Mar. 23, 2015

Cannabis researchers in Maryland exposed pot plants to ultraviolet radiation to see what would happen. They found that increasing doses of UVB radiation, a natural part of sunlight made the plants produce almost 28% more THC in the buds.

In attempting to understand more about the function cannabinoids serve, the scientists discovered a relatively simple way to increase potency by a great margin. They ran the UVB experiment on both high-CBD hemp and potent Jamaican marijuana to see if the cannabinoids content would increase. Curiously enough, while THC increased in the Jamaican weed, the Czechoslovakian hemp received from the University of Mississippi did not produce more CBD.

So UVB radiation plays a role in THC production, but cannabinoids as a whole still retain their mystique. One fact can't be denied: UVB radiation increases THC in strains that already express high THC.

How to Take Advantage of the Effect

UV light intensity increases significantly at higher altitudes; the best hash plants in the world are grown in mountains and elevated regions. According to the National Weather Service, UV light increases "4-5% for every 1000 feet ascended." This means going from Phoenix to the top of the San Francisco Peaks increases UV radiation by 50%!

States like Arizona, New Mexico and Colorado receive some of the highest intensities of UV light with little cloud cover compared to northern states.

Special fluorescent light bulbs generate radiation similar to natural UV light, and were used in the study. Growers put the plants under 40 W Westinghouse FS-40 Sunlamps 10 inches from the canopy. Those exact light bulbs might be hard to find now, but similar, relatively inexpensive products are available in bulk and would be the best option for greenhouse-sized grows. The lights were filtered with cellulose acetate to remove the UVC spectrum-potent, damaging ultraviolet rays that are naturally filtered out by the ozone layer.

Micro and mini grow-ops can benefit from UVB supplementation, but need smaller bulbs. Desert reptiles like the bearded dragon require the radiation to make vitamin D, just as humans do. You can purchase a small UVB-emitting lamp at most pet stores. Mineral enthusiasts also use UVB lamps to make their rocks fluoresce, but the small handheld lamps are probably not potent enough for even a single plant.

Wikipedia—Emerson Effect

The Emerson effect is the increase in the rate of photosynthesis after chloroplasts are exposed to light of wavelength 670 nm (far red light) and 700 nm (red light). When simultaneously exposed to light of both wavelengths, the rate of photosynthesis is far higher than the sum of the red light and far red light photosynthesis rates. The effect was earlier evidence that two photosystems, processing different wavelengths, cooperate in photosynthesis.

Other Sources

Emerson Effect

Also known as "The Mars effect", this is an area for experimentation by advanced growers of marijuana indoors. It has been noted that the addition of far red light (700-720 nm) may double the rate of photosynthesis when used in conjunction with deep red light (650 nm-670 nm). This effect only lasts for an hour or two. Far red LEDs or incandescent bulbs are the main sources of 720 nm light. Understanding this information should not concern the casual grower but it is good to know though.

Ultraviolet Light and Potency

There is yet another long-standing debate as to whether or not the addition of UV-A or UV-B increases the potency of indoor grows. This theory came about because of the generally higher THC may act to protect marijuana from UV damage. Despite several white papers published by reputable horticulturists, the answer remains murky. We believe this is so because most tests use low to moderate amounts of UV for a 12 hour period; whereas a shorter 1-3 hour burst of strong UV may be necessary to induce any effect.

UV-C to Kill Pests and Molds: Germicidal Lamp

The term "UV" refers to relatively broad spectrum of light-anything from 100 nanometers to 400. So UV has been further divided into UV-A, UV-B, UV-C and UV-V. The part we are interested here is UV-C. It's the section of UV between 185 and 280 nanometers—also known as "short wave ultraviolet radiation". UV-C rays have the highest energy and are arguably the most dangerous part of UV light. (Although some would counter that UV-B is the more dangerous as it causes skin cancer.) Solar radiation in the UV-C range is absorbed almost entirely by the atmosphere. Artificial UV-C lamps have been shown to be super effective in the laboratory at destroying bacteria, mold, viruses and certain plant pests as well as other biological contaminants in the air, liquids, or on solid surfaces.

Although the present invention has been described with reference to the disclosed embodiments, numerous modifications and variations can be made and still the result will come within the scope of the invention. No limitation with respect to the specific embodiments disclosed herein is intended or should be inferred. Each apparatus embodiment described herein has numerous equivalents.

I claim:

1. A vertical grow lamp tower comprising:
   at least two parallel vertical frame members forming a space there between;
   at least two ballast boxes mounted in the space;
   said ballast boxes having a daisy chain power connection;
   each ballast box powering a primary grow lamp mounted thereto;
   an auxiliary LED light connected to one of the two parallel vertical frame members;
   one of the at least two ballast boxes powering the auxiliary LED light; and
   wherein the auxiliary LED light further comprises a wavelength which modifies a spectrum of the primary grow lamp.

2. The tower of claim 1, wherein the auxiliary LED light is cooled by a vertical frame member to which it is attached.

3. The tower of claim 2, wherein the vertical frame member to which the LED is attached further comprises a fluid channel therein.

4. The tower of claim 2, wherein the vertical frame member to which the LED is attached further comprises a cooling fin.

5. The tower of claim 1, wherein the auxiliary LED light is cooled by a support bracket that is coupled to a vertical frame member.

6. The tower of claim 5, wherein the support bracket further comprises a fluid therein.

7. The tower of claim 5, wherein the support bracket further comprises a cooling fin.

8. The tower of claim 1, wherein the primary grow lamp is a ceramic metal halide lamp.

9. The tower of claim 1, wherein the primary grow lamp is a LED lamp.

10. The tower of claim 1, wherein the wavelength which modifies a spectrum of the primary grow lamp further comprises a frequently range selected from the group consisting of red, blue and UV.

11. A vertical grow lamp tower comprising:
    a vertical cabinet;
    at least two ballast box and grow lamp assemblies mounted on the vertical cabinet;
    each grow lamp assembly having a primary grow lamp;
    wherein said primary grow lamps are located along a common vertical axis;
    the tower further comprising an LED auxiliary light which modifies a wavelength of the primary grow lamp; and wherein the vertical cabinet cools the LED auxiliary light.

12. The tower of claim 11, wherein the vertical tower further comprises a fluid channel therein for cooling the LED auxiliary light.

13. The tower of claim 11, wherein the vertical tower further comprises a cooling fin for cooling the LED auxiliary light.

14. The tower of claim 11, wherein each grow lamp is attached to its respective ballast box.

15. The tower of claim 11, wherein the LED auxiliary light is powered by a grow lamp ballast.

16. The tower of claim 15, wherein each ballast box and grow lamp assembly has a ballast box which is daisy chained to an adjacent ballast box to share a common power supply receptacle.

17. The tower of claim 11, wherein the wavelength which modifies a wavelength of the primary grow lamp further comprises a frequency range selected from the group consisting of red, blue and UV.

* * * * *